United States Patent [19]
Granlund

[11] 3,750,101
[45] July 31, 1973

[54] SYSTEM FOR AUTOMATICALLY CHECKING BRAKE REGULATING SYSTEMS

[75] Inventor: Gösta Holger Granlund, Goteborg, Sweden SW

[73] Assignee: Saab-Scania Aktiebolag, Linkoping, Sweden

[22] Filed: July 27, 1971

[21] Appl. No.: 166,412

[30] Foreign Application Priority Data
July 27, 1970 Sweden............................ 10293/70

[52] U.S. Cl............................ 340/52 B, 188/181 C
[51] Int. Cl.............................................. B60t 17/22
[58] Field of Search................. 340/52 R, 52 B, 53; 303/21 R; 188/181 R, 181 C

[56] References Cited
UNITED STATES PATENTS

| | | | |
|---|---|---|---|
| 3,545,819 | 12/1970 | Gaffney............................ | 303/21 R |
| 3,606,491 | 9/1971 | Walsh......................... | 188/181 C X |
| 3,635,530 | 1/1972 | Packer et al................ | 188/181 R X |

Primary Examiner—Alvin H. Waring
Attorney—Cushman, Darby & Cushman

[57] ABSTRACT

This invention is related to a safety checking device for an electronic braking system used primarily in wheeled vehicles and which indicates a malfunction of the system before the braking system is applied. The safety device introduces a signal to an electronic unit in the braking system; if there is a failure thereof, a warning circuit is triggered to give a proper alarm to the vehicle operator. The safety device is also designed so that it does not operate during application of the braking system.

6 Claims, 1 Drawing Figure

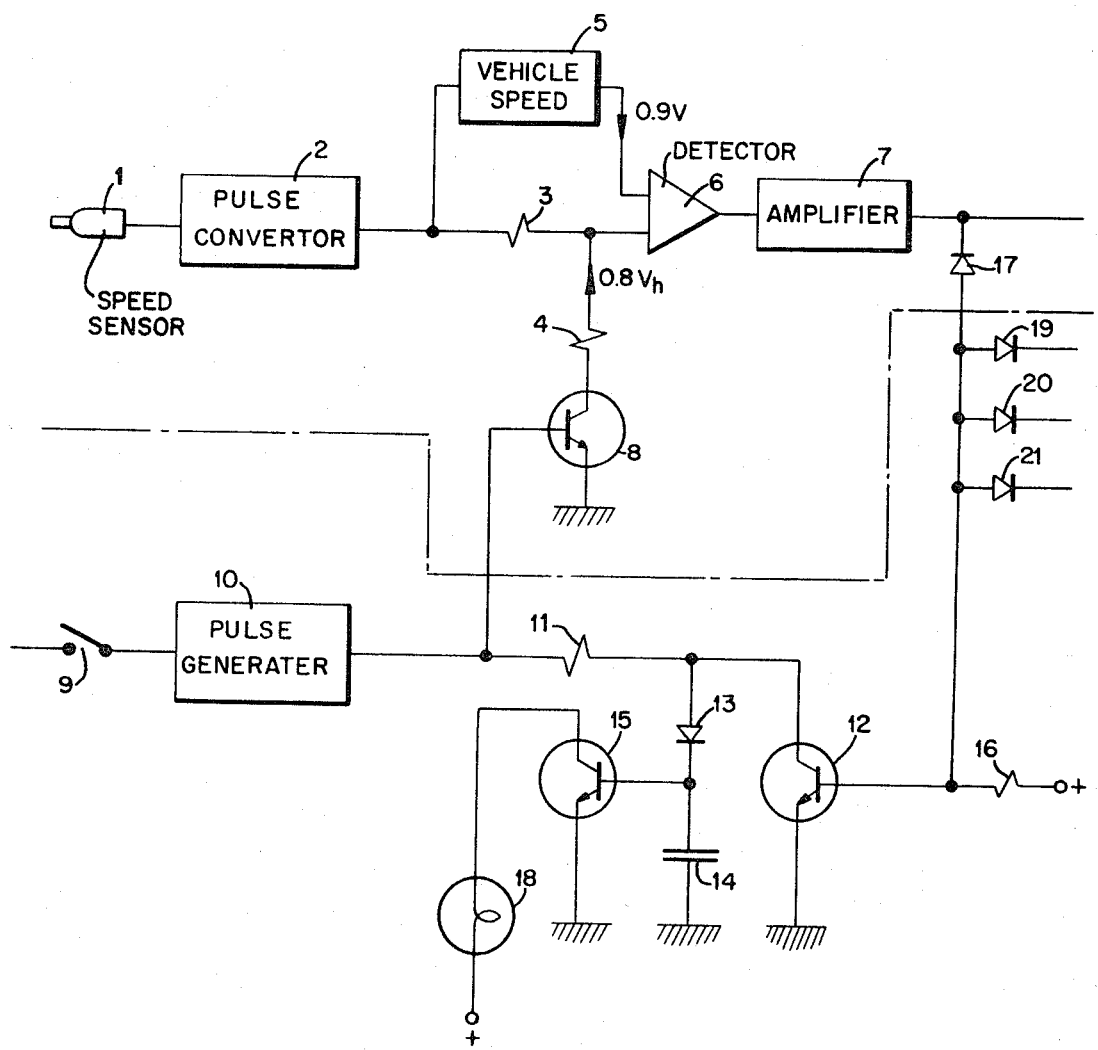

SYSTEM FOR AUTOMATICALLY CHECKING BRAKE REGULATING SYSTEMS

The present invention relates to a system for automatically checking that an electronic brake controlling system embodied in a wheeled vehicle generates signals in speed sensing input means to an electronic unit which detects the braking effect of individual wheels, and that the unit indicates, in response to signals fed thereto, any changes in wheel speed relative to the vehicle and at pre-determined reference values for the speed changes in question sends control signals to a number of solenoid valves or like means arranged as output means, regulating the brake pressure in the brake lines of respective wheels.

The purpose of the present invention is to check at intervals the measuring means and electronic unit monitoring the brake control system of the vehicle, and with this purpose in mind the checks are based upon the concept of simulating repeated blocking tendencies for respective wheels on the vehicle and of consistently detecting the control signals sent by the electronic unit to respective valves. The system according to the present invention is mainly characterized by the fact that a pulse generator, which is connected to the electrical system of the vehicle and capable of being activated and de-activated by its ignition switch, is arranged to send at time intervals, during which the brakes are not applied, short pulses of determined time intervals to intermittently close one or more electric circuits connected to respective wheel signal circuits in the electronic unit and to voltage regulating means, this electric circuit being arranged to increase or decrease at least one input voltage supplied in each signal circuit to a signal comparison detector so that the detector transmits an output signal representing non-applied brakes, and that a diode or similar electronic component is arranged to detect said output signal and in the absence of such a signal to trigger an alarm in a warning circuit in the check unit.

Such a check on the brake system of the vehicle is made automatically subsequent to turning on the vehicle ignition system and is not interrupted until the brake light switch or similar means is manipulated during a braking action. This means that in the event of a failure in the brake regulating system of the vehicle at any time during a normal run, the driver of the vehicle is warned of the situation by an alarm indicator in the vicinity of the driver's seat.

According to another aspect of the invention, a signal corresponding to the prevailing movement of an individual wheel is compared with a reference signal for establishing wheel blocking tendency irrespective of how the electronic brake regulating system is constructed and designed to detect such tendencies. Such a reference signal can be formed from a previously measured speed of the wheel or other appropriate component, or may constitute a signal which represents the prevailing speed of the vehicle. In this latter instance, the signal is fed from a calculating circuit for the predicted speed of the vehicle in the electronic unit to a detector embodied therein for individual wheels, it being known to reduce this signal before the input to the detector for the purpose of obtaining a brake regulating effect around a lag limit adjacent the limit which corresponds to the maximum braking power of the vehicle. This means that during a braking sequence the detector will only transmit control signals when this lag limit has been passed for individual wheels.

Thus, in order to simulate a blocking tendency for individual wheels it is necessary to scale down the prevailing wheel speed signal so that the signal falls below the input vehicle speed signal, or to increase the predicted vehicle speed signal so that it definitely exceeds the prevailing wheel speed signal, or to achieve simulation by using a combination of these expedients. With a preferred embodiment of the invention, this is effected with the aid of a resistance circuit coupled to the signal circuit of each individual wheel before the input to the detector. The invention is mainly characterized by the fact that pulses from the pulse generator are fed into a transistor or like gate element arranged to regulate the resistance circuit and cause the transistor to earth resistance connected to the signal circuit, whereby the input voltage of the signal circuit to the detector is reduced by a scaling down factor corresponding to the magnitude of the resistance as a result of voltage division.

The warning circuit incorporated in the system of the present invention includes a transistor or like gating element which is controlled by the detecting diodes in cooperation and which is energized only by the presence of output signals representing the termination of a braking sequence from all detectors in the electronic circuit, whereupon a line passing from the pulse generator to the alarm triggering means in the warning circuit is connected to earth. The alarm triggering means is in the form of a warning lamp controlled by a transistor or like electronic component acting as a power stage and whose base voltage is controlled by the charged condition of a capacitor which is fed, via a blocked diode, with pulses from the pulse generator when the transistor controlled by the detecting diodes is choked.

The invention will now be described with reference to the accompanying drawing which illustrates diagrammatically a checking system constructed in accordance with the invention and connected to a signal circuit embodied in an electronic brake regulating system.

A blockage preventing control system is normally constructed to control individually the braking action of each vehicle wheel so that a reference level predetermined with respect to speed, retardation or lag is substantially maintained during a braking sequence. With the exemplified brake control system, the principle of control is based on the concept of controlling the braking operation for each individual wheel, independently of its prevailing lag. In view of this, it is necessary to determine the speed of each individual wheel. To achieve this, there is securely mounted to each wheel a toothed wheel (not shown) which co-acts with a magnetic transducer 1 stationarily positioned adjacent the wheel and arranged to emit signals for each tooth which passes the transducer 1. The frequency of the thus generated train of pulses represents at each measuring operation the prevailing angular speed of the wheel.

The above mentioned pulses are passed to an electronic unit mounted in the vehicle and provided with four signal circuits having individual connections to the transducers 1, which are arranged as input means. The signal circuits are identical with respect to construction and mode of operation and consequently the following description will be limited to disclose how the checking system of the present invention cooperates with one such signal circuit.

The signal circuit includes pulse converting means 2 in which the pulses from the transducer 1 are transformed and converted in a known manner to a voltage signal which is normally fed, via a resistance 3, on the negative input of a detector 6. The detector 6 is arranged to compare the value received for the prevailing wheel speed with a stored value previously received and relating to the speed during free rolling of the wheel, or with a signal value fed into the detector 6 and representing the speed of the vehicle.

Irrespective of which measuring method the control system is adapted for, the purpose of the detector 6 is to detect a blocking tendency of the vehicle wheels, by comparing and computing received signals, and to indicate an electrical magnitude which is fed to a driving stage 7 which amplifies the output signal and passes the amplified signal to a wheel braking action control valve (not shown) in the brake lines of the wheel.

The accompanying drawings illustrates how a peak follow-up circuit 5 is arranged to supply the positive input of the detector 6 with a reduced signal voltage representing the vehicle speed. This reduction of a signal representing the predicted speed of the vehicle and generated in the control system is suitably effected in a resistance circuit (not shown) arranged before the detector and enables a control signal leaving the detector 6 to obtain a control function dependent on the speed of the vehicle for the difference between the acutal lag and a desired reference lag.

The checking system of the present invention is connected to the above described control system in order to monitor periodically the detecting measuring means and electronic unit of the control system. To this end, the checking system is arranged to simulate blocking tendencies in each individual signal circuit in the control system and to detect the output control signals of the detector 6 in question.

In view of this, the checking system includes, as common means for monitoring the different signal circuits, a pulse generator 10 and a warning circuit 11–16, 18 and, as individual means in each signal circuit, a resistance circuit 4, 8, which is connected before the detector 6, and a diode 17 connected to the output of the driving stage 7.

The pulse generator 10 is connected to the electrical system of the vehicle and can be energized and de-energized by the system ignition switch (not shown). The pulse generator 10 is also dependent on the conductive state of the vehicle brake light contact 9 in a manner whereby the pulse generator 10 is de-energized when the brake light contact 9 is closed, which means that the checking function of the system ceases during a braking sequence.

The pulse generator 10 is arranged to emit short pulses of determined time intervals. In the exemplified embodiment, the pulse length has been selected at 2 milliseconds and the intermediate intervals at 5 seconds. The pulses are fed primarily to the resistance circuits, in which they excite a transistor 8 and cause it to connect the lower end of a resistance 4 to earth, whereupon the resistance 4 together with a resistance 3 embodied in the signal circuit acts to divide the voltage generated in the signal circuit and representing the prevailing wheel speed. As a result, the signal voltage supplied to the negative input of the detector 6 will take on values which are interpreted by the detector as a lag exceeding the reference level.

The transistor 8 is normally inactive so that the wheel speed $V_h$ is compared in a conventional manner in the detector 6 with e.g., 0.9 V, in which expression $V$ is the predicted speed of the vehicle. When the brakes of the vehicle are in their inoperative state, i.e. not applied, $V_h = V$, and thus $V_h > 0.9V$; the result being that the ordinary braking system of the vehicle is maintained operative.

Upon connection of the resistance 4 to earth during the pulse length of 2 milliseconds, which takes place provided that the vehicle is not braked, the voltage supplied to the detector 6 is reduced to say 0.8 $V_h$, which, when compared with the voltage of 0.9 V fed to the position input causes the detector to send a signal to the solenoid valve, after amplification in the driving stage 7, for deactivating the brake system.

Thus, in accordance with the principle of the checking system of the present invention, a positive output signal from the driving stage 7 during the time a pulse is transmitted from the pulse generator 10 is the criterium that the measuring means and electronic components in the signal circuits in question operate in the manner intended. The output signals are detected through a line which is connected to the output of the drive stage 7 and to the positive pole of a voltage source and which includes a blocking diode 17 which is switched off upon receipt of positive output signals from the drive stage 7 and switched on upon receipt of negative pulses and passes to earth via the valve.

The detecting diodes 17,19,20,21 in respective signal circuits are connected together by conductors and arranged to cooperate by logical addition of their respective states so as to excite a transistor 12 in the common alarm circuit. The alarm circuit includes a warning lamp 18 which is controlled by a transistor 15 acting as a power stage and energized by the charged state of a capacitor 14. The capacitor 14 is connected, via a blocking diode 13, in parallel with the transistor 12 to a branch line passing from the pulse generator 10, the branch line having included therein a load restricting resistance 11 which ensures the supply of pulses to the transistor 8.

If the control system as a whole is in an operational state, all driving stages 7 send positive output signals when the pulses trigger a simulated blockage and a resistance 16 provides the necessary base voltage to excite the transistor 12, causing the transistor to connect the branch line containing the resistance 11 to earth, whereupon the capacitor 14 receives no charge.

On the other hand, if for some reason or other one or more of the driving stages 7 do not send positive output pulses during the pulse interval, the state of the transistor 12 is analogous with the earlier inoperative state and the pulses fed from the generator 10 in the branch line via the resistance 11 will charge the capacitor 14 so that it obtains the base voltage necessary to excite the transistor 15, whereupon the warning lamp 18, which is suitably located in the vicinity of the driver's seat, is ignited for each pulse and by repeated blinking at a freguency corresponding to the pulse frequency informs the driver that the brake control system is out of order.

The invention is not restricted to the described and illustrated embodiment, but can be modified within the essence of the invention, for instance, instead of reducing in respective signal circuits the signal voltage representing the prevailing wheel speed, it is possible to amplify intermittently the signal which represents the predicted vehicle speed and thereby obtain a simulated blockage tendency, this amplification optionally being effected in a common unit for calculating the vehicle speed and embodied in the electronic unit. I claim:

1. A system for checking the malfunction of a control system in combination therewith for an electronic brake control used for at least one wheel of a wheeled vehicle when the brakes are not applied comprising:
   an output means;
   a speed sensing means that transmits input signals which indicate changes in wheel speed;
   a detector means operatively arranged with the sensing means so as to respond to the input signals and thereby transmit at predetermined reference levels control signals adapted to operate the output means;
   a resistance circuit including a resistance connected to the detector;
   a pulse generator connected to an electrical system of the vehicle and capable of being activated and deactivated by an ignition switch of the vehicle for transmitting at certain intervals short pulses to the resistance circuit wherein in dependence on said pulses the resistance circuit is intermittently connected to ground thereby causing a voltage division and a reduction of the input signals to the detector so that in response thereto the detector transmits an output signal that the breaks are not applied;
   an alarm circuit; and
   a means detecting an absence of said output signal for triggering the alarm.

2. The arrangement according to claim 1, wherein the resistance circuit comprises:
   a transistor that is arranged to be activated by said pulses to intermittently connect the resistance to ground so as to trigger simulated output signals from the detector.

3. A system for automatically checking for a malfunction in an electronic brake control used for at least one wheel of a wheeled vehicle when the brakes are not applied comprising: a brake line output means connected to the wheel; a speed sensing means that transmits input signals which indicate changes in wheel speed; an electronic unit including a detector which detects and compares signals and operatively arranged with the speed sensing means so as to respond to the input signals and thereby transmit at predetermined reference levels control signals to control pressure in the output means, the improvement comprising: a resistance circuit connected to the electronic unit including: a resistor; a pulse generator connected to an electrical system of the vehicle and capable of being activated and deactivated by an ignition switch of the vehicle for transmitting at certain intervals short pulses to the resistance circuit wherein in dependence on said pulses the resistance circuit is intermittently connected to ground, thereby causing a voltage division and a reduction of the input signals to the detector, so that the detector in response thereto transmits an output signal that the brakes are not applied; an alarm circuit; and a means detecting an absence of said output of signal for triggering the alarm.

4. A system according to claim 3, wherein the resistance circuit comprises:
   a transistor that is arranged to be activated by said pulses to connect the resistance to ground so as to trigger simulated output signals from the detector.

5. A system according to claim 3, wherein the alarm circuit includes a transistor or like gating element which is controlled by the detecting means in cooperation and which is excited only by the presence of output signals from all the detectors in the electronic unit representing non-applied brakes, thereby connecting to earth a line passing from the pulse generator to alarm triggering means embodied in the alarm circuit.

6. A system according to claim 5, wherein the alarm triggering means includes a warning lamp controlled by a transistor or like electronic component acting as a power stage and having a base voltage which is regulated by the changed state of a capacitor which is supplied, via a blocking diode, with pulses from the pulse generator when the transistor controlled by the detecting diodes is switched off.

* * * * *